United States Patent [19]

Salmela et al.

[11] Patent Number: 4,953,256
[45] Date of Patent: Sep. 4, 1990

[54] COUNTERBALANCE MECHANISM

[75] Inventors: Gordon O. Salmela, Lexington; Michael L. Pizzarella, Shrewsbury, both of Mass.

[73] Assignee: Raytheon Company, Lexington, Mass.

[21] Appl. No.: 306,733

[22] Filed: Feb. 6, 1989

[51] Int. Cl.$^5$ ................. E05D 13/00; F16M 11/00
[52] U.S. Cl. ................................. 16/1 C; 16/201; 312/312; 248/572
[58] Field of Search ............. 16/1 C, 201, 195; 312/312; 248/123.1, 297.1, 364, 572; 187/94

[56] References Cited

U.S. PATENT DOCUMENTS

| | | | |
|---|---|---|---|
| 337,536 | 3/1886 | Thomas | 16/201 |
| 466,941 | 1/1892 | Goldy | 16/201 |
| 577,720 | 2/1897 | Cobb | 312/312 |
| 3,575,368 | 4/1971 | Thomas et al. | 248/572 |
| 4,571,775 | 2/1986 | Leonard | 16/298 |
| 4,621,391 | 11/1986 | Leonard | 16/299 |
| 4,670,940 | 6/1987 | Leonard | 16/308 |

OTHER PUBLICATIONS

"Counterbalance Torque is Adjustable, Compact", Excellence in Design, Health/Zenith Computer Winner, Design News, Frank Yeaple, Nov. 4, 1985, pp. 94–96.
"Program Designs Spring Counterbalance", Tech Briefs, Machine Design, Jamil Ahmad, Jun. 25, 1987, p. 110.

Primary Examiner—Richard K. Seidel
Assistant Examiner—Carmine Cuda
Attorney, Agent, or Firm—Walter F. Dawson; Richard M. Sharkansky

[57] ABSTRACT

A counterbalance mechanism for negating the force of gravity when moving a display cabinet shelf up or down. The mechanism has a torsion spring counterbalance on a shaft extending the width of the shelf and gears at each end of the shaft which engage travelling rack gears attached beneath each end of the shelf. The shelf includes integral guide rails rolling on four bearings attached to the stationary frame of the cabinet. The use of spiral gears compensates for the spring torque variation and provides constant tangential gear force on the shelf regardless of the vertical position of the shelf. Having gears at each side of the moving shelf joined by a common shaft minimizes side-to-side tilting.

16 Claims, 3 Drawing Sheets

COUNTERBALANCE MECHANISM

The government has rights in this invention pursuant to Contract No. DTFA01-84-C-0039 awarded by the Federal Aviation Administration.

BACKGROUND OF THE INVENTION

This invention relates to counterbalance devices for negating the force of gravity and more particularly to a spring counterbalance mechanism.

Equipment consoles for housing electronic test equipment or computer-display equipment often have a horizontal shelf for holding a keyboard and other operator interface controls or display equipment. Such a shelf may be adjustable in the vertical direction and such adjustment is usually manual by releasing a latch and lifting or lowering the shelf on rolling bearings. Manual operation of such a shelf eliminates the costs associated with drive motors, controls and safety interlocks. The weight of such a shelf may be approximately 125 lbs. and it may be desireable to counterbalance it to within 5 lbs. to minimize operational effort during vertical travel of the shelf.

Several counterbalance devices exist in the prior art for negating the force of gravity. For example, a gas spring uses a pressurized gas in a cylinder to store energy; as a piston rod moves axially, it acts like a compression spring. The gas spring stores more energy than an equal size steel spring, but has seal drag, leakage and temperature sensitivity. Also, because it is an axial device, it must be used with a linkage to compensate for force change over its stroke. Furthermore, any type of axial spring, whether steel coil or gas offers no guidance for shelf motion. Common counterbalance applications include automobile hoods, drafting boards and office chairs. However, the residual imbalance plus friction for these commercial devices is more than 5 lbs. and degradation of the counterbalance effect over time is undesireable. The optimum counterbalance mechanism must result in a shelf that is smooth and quiet in operation and that is stiffly restrained in all six "degrees-of-freedom" to provide good "feel" to the user.

SUMMARY OF THE INVENTION

In accordance with the present invention a counterbalance mechanism is provided for negating the force of gravity on an apparatus comprising means for guiding an apparatus along a vertical or inclined path, shaft means disposed between stationary sides of the apparatus for providing a force to counter the force of gravity on the apparatus, means for transferring the force to the apparatus in a constant manner independent of the apparatus position, the force transferring means comprises spiral gears, disposed on a first end and a second end of the shaft means, and rack gears attached to the apparatus guiding means in a vertically oriented position, each of the rack gears positioned to engage one of the spiral gears. The guiding means comprises guide rails for maintaining the vertical path, and rolling bearings are attached to the stationary sides for sliding along the guide rails. The force providing shaft means comprises a torsion spring wrapped around a shaft, a first end of the spring is attached to the shaft means and a second end is secured to a non-rotating portion of the apparatus. Each of the stationary sides of the apparatus comprises a hole with rotary bearings for supporting the shaft means. In addition, the counterbalance mechanism comprises means for adjusting the relative positions of each end of the torsion spring by an adjustable spring stop assembly attached to the non-rotating portion of the apparatus.

In accordance with a further feature of the invention an adjustable shelf of an equipment console having a counterbalance mechanism is provided comprising a shaft extending the width of the shelf through holes having rotary bearings in the sides of the equipment console, a torsion spring wrapped around a portion of the shaft, one end of the spring attached to the shaft and the other end secured to a non-rotating portion of the equipment console, a first spiral gear disposed on a first end of the shaft and a second spiral gear disposed on a second end of the shaft, a shelf slide means for moving said shelf in a vertical or inclined path, and a first rack gear and a second rack gear attached in vertical positions to engage the first spiral gear and the second spiral gear respectively disposed on the ends of the shaft. The shelf slide means comprises a plurality of guide rails positioned on opposite sides of the shelf slide means to enable the shelf to move in the vertical or inclined path. The adjustable shelf comprises rolling bearings for guiding the shelf slide in accordance with the guide rails and latching means for securing the shelf at one of a plurality of positions along the vertical or inclined path.

In accordance with a further feature of the invention a method is provided of counterbalancing an adjustable shelf of an equipment console comprising the steps of extending a shaft affixed to the equipment console the width of the shelf, each end of the shaft being supported and surrounded by rotary bearings, wrapping a torsion spring around a portion of the shaft, one end of the spring being secured to a non-rotating portion of the equipment console and the other end of the spring being attached to the shaft, disposing a first spiral gear on a first end of the shaft and a second spiral gear on a second end of the shaft, moving the shelf in a vertical or inclined direction by slide means, and engaging a first rack gear and a second rack gear to the first spiral gear and the second spiral gear respectively, the first rack gear and the second rack gear being attached to the shelf slide means at a slight angle to the direction of shelf motion. The step of wrapping a torsion spring around a portion of the shaft comprises the step of adjusting the relative positions of each end of the torsion spring by an adjustable spring stop assembly attached to the non-rotating portion of the equipment console.

BRIEF DESCRIPTION OF THE DRAWINGS

Other and further features and advantages of the invention will become apparent in connection with the accompanying drawings wherein.

DESCRIPTION OF THE PREFERRED EMBODIMENT

Figure 1:
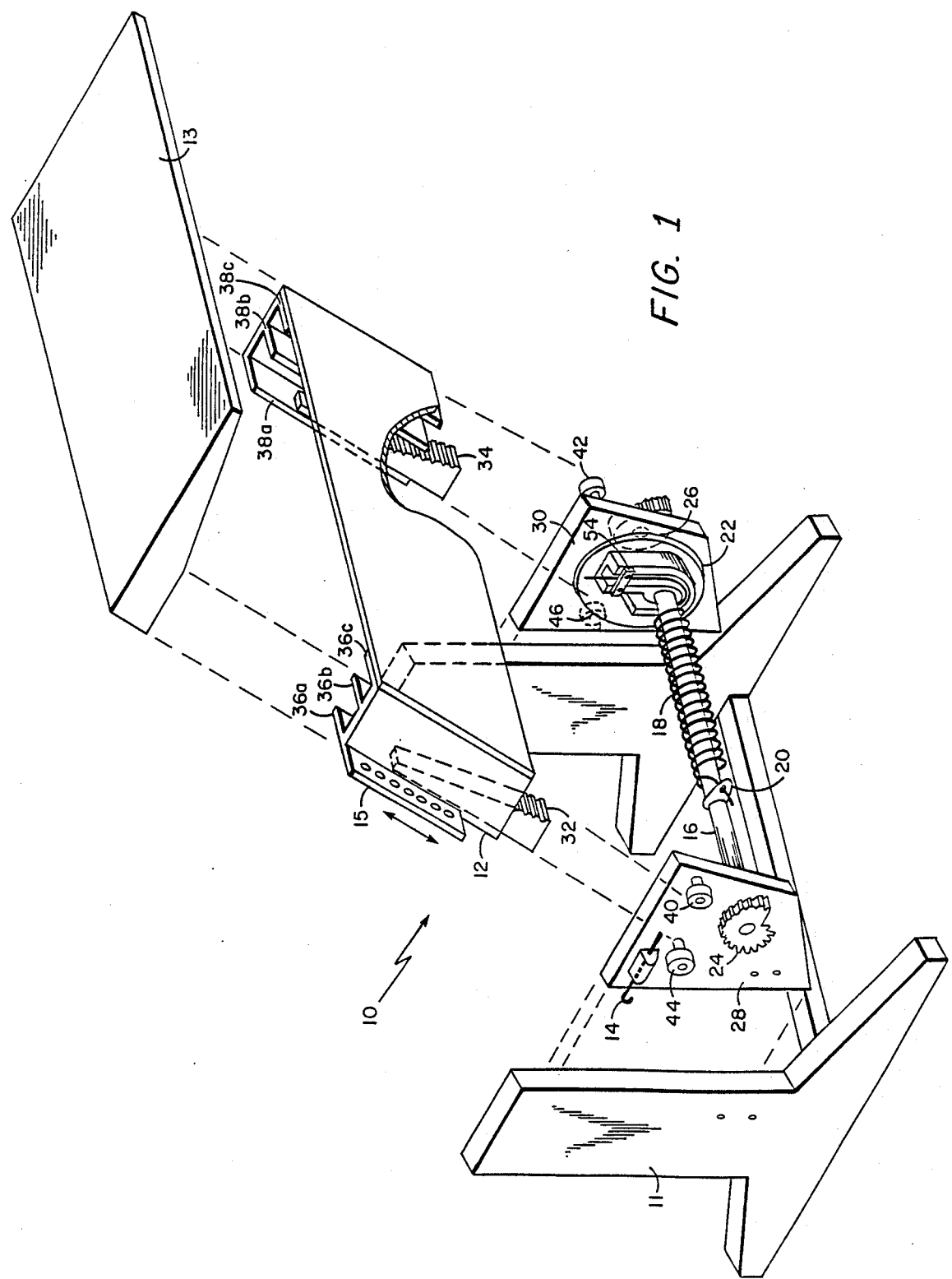
FIG. 1 is an exploded perspective view of a spring counterbalance invention in a moveable shelf attached to the front of an equipment console.

Referring to FIG. 1, there is shown an exploded perspective view of a shelf assembly 10 for an equipment console which is adjustable in a predetermined vertical or inclined direction when a latch 14 is released from a latch plate 15. The shelf assembly 10 has a spring counterbalance mechanism for negating the force of gravity comprising a shaft 16 extending the full width of the shelf assembly 10 and supported by stationary shaft support frames 28, 30 of the equipment console. A torsion spring 18 is wrapped around a portion of the shaft 16 for supplying torque to the shaft 16, and each one of spiral gears 24, 26 is mounted on the ends of the shaft 16. The torsion spring 18 is secured to the shaft 16 by an attachment arm 20 and at the other end to support frame 26 by an adjustable spring stop assembly 22. The spiral gears 24, 26 engage travelling tapered rack gears 32, 34 which are attached to the shelf slide 12 and move up and down with the shelf 13. The shelf slide 12 further includes integral guide rails 36a, 36b, 36c, 38a, 38b, 38c for rolling on four roller bearings 40, 42, 44, 46 which restrict the shelf 13 motion to a desired vertical or inclined path.

Figure 2:
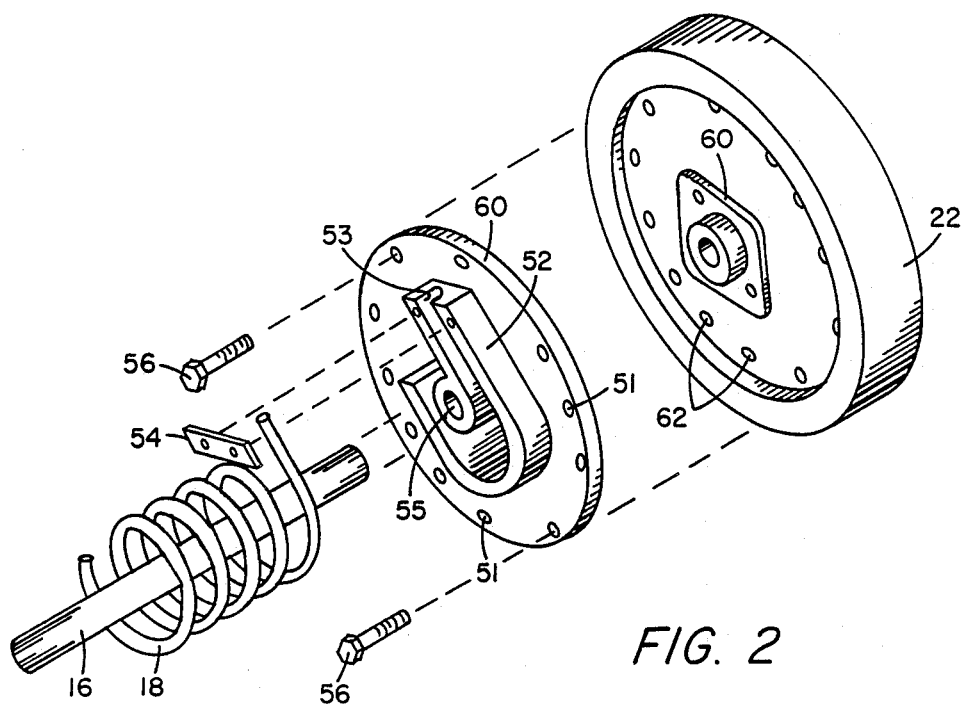
FIG. 2 is an exploded perspective view of an adjustable spring stop on one end of a shaft showing a torsion spring secured thereto.

Referring to FIG. 1 and FIG. 2, FIG. 2 shows an exploded perspective view of the adjustable spring stop assembly 22 comprising an adjusting plate 50 which is attached to the spring stop assembly 22 by bolts 56, 58. The shaft 16 with the torsion spring 18 wound around it passes through a hole 55 in the adjusting plate 50 and then passes through a matching hole in the shaft support frames 28, 30 having rotary bearings 60 surrounding the shaft. The bolts 56, 58 are inserted into a pair of a plurality of tapped holes 62 which are spaced and aligned with a plurality of holes 51 in the adjusting plate 50. The torsion spring 18 is secured in a groove 53 formed on the adjusting plate 50 by a clamping plate 54. By fixing the spring end to an intermediate piece, the adjusting plate 50, the spring 18 can be adjusted (or "wound") as required to correct for manufacturing variations of the spring, these include spring rate variation and relative position of the two spring ends. The adjusting plate 50 includes the groove 53 shaped to center the spring as well as to transmit torque along its axis. The adjusting plate 50 includes the mounting holes 51 arranged to give the choice of many angular positions. By using a quantity of holes differing by 2 from the number of tapped holes in the corresponding fixed assembly only two pairs will line up at any position, but the number of such positions is multiplied. If there are N holes in the plate and N+2 holes in the fixed assembly 22, the number of choices is $$\frac{(N)(N+2)}{2}.$$

For the particular choice 2 in this embodiment, 12 holes and 10 tapped holes, the number is 60, giving 6 degree increments of adjustment, and allowing spring torque to be set precisely at assembly.

Figure 3:
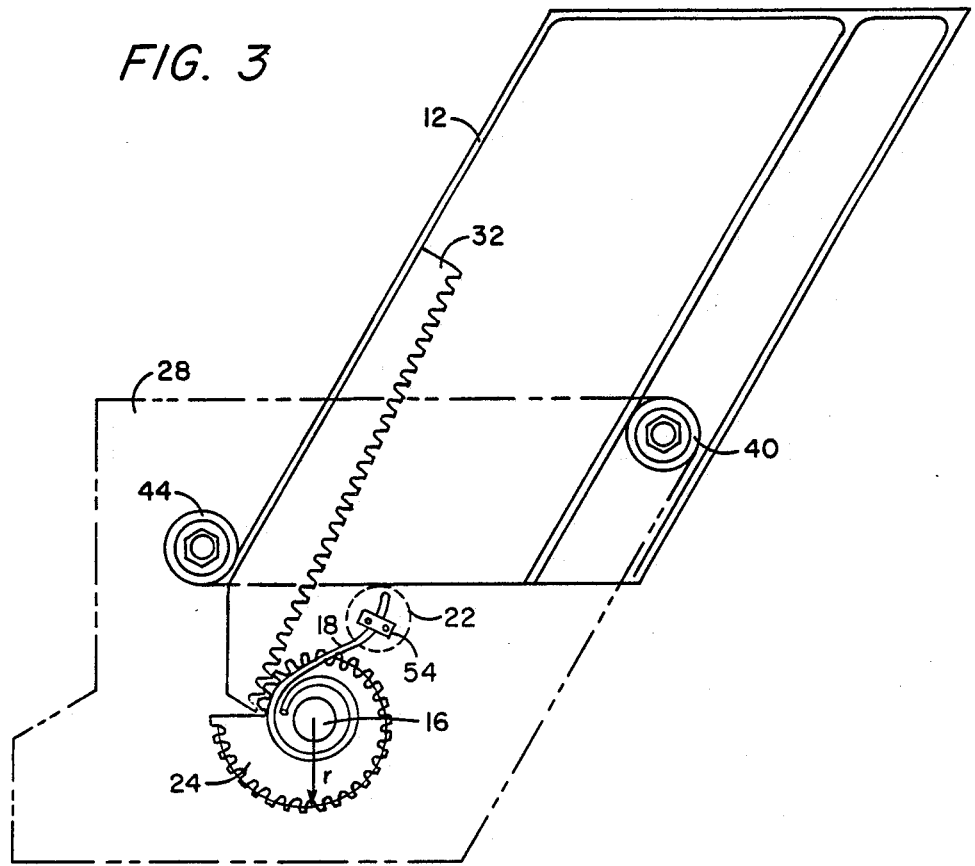
FIG. 3 is a view of one of the spiral and rack gears of the invention showing the torsion spring unwound at minimum torque when the shelf is at its highest position.
Figure 4:
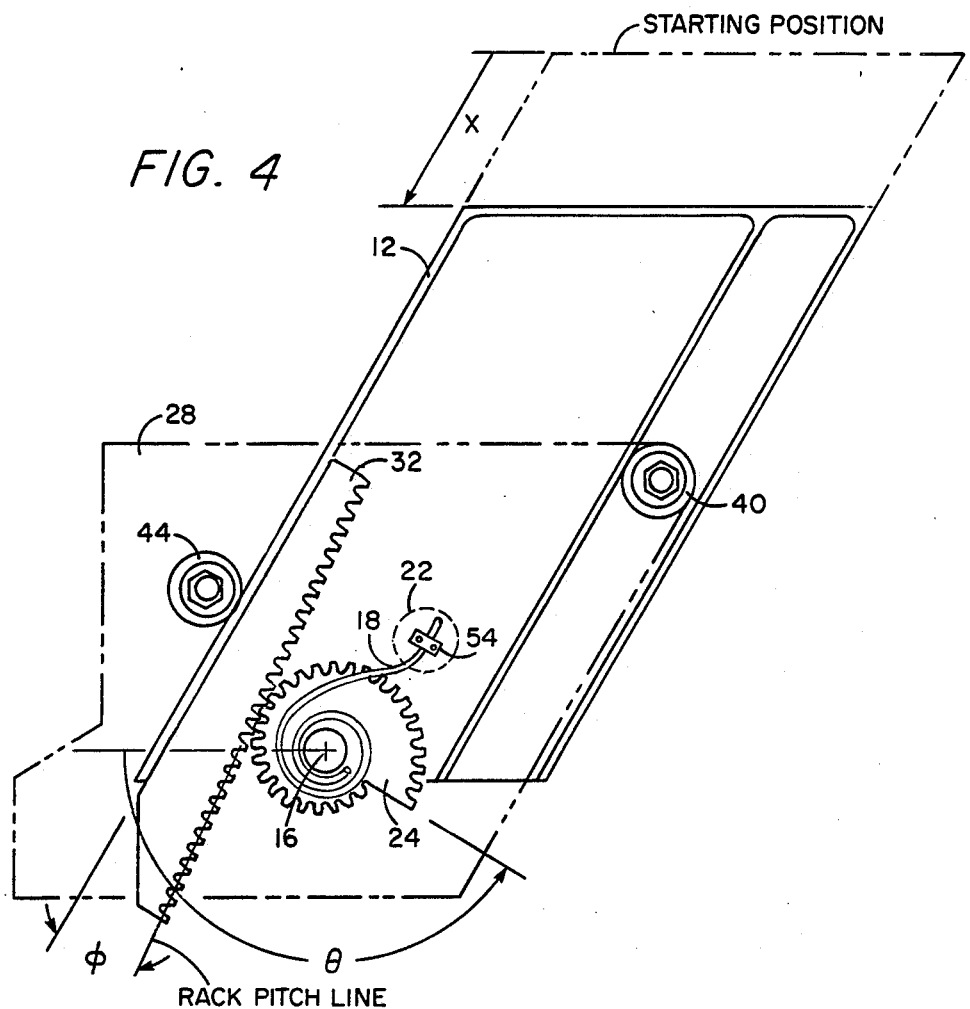
FIG. 4 is a view of the spiral and rack gears and torsion spring of the invention showing the spring partially wound when the shelf is at a nominal position.
Figure 5:
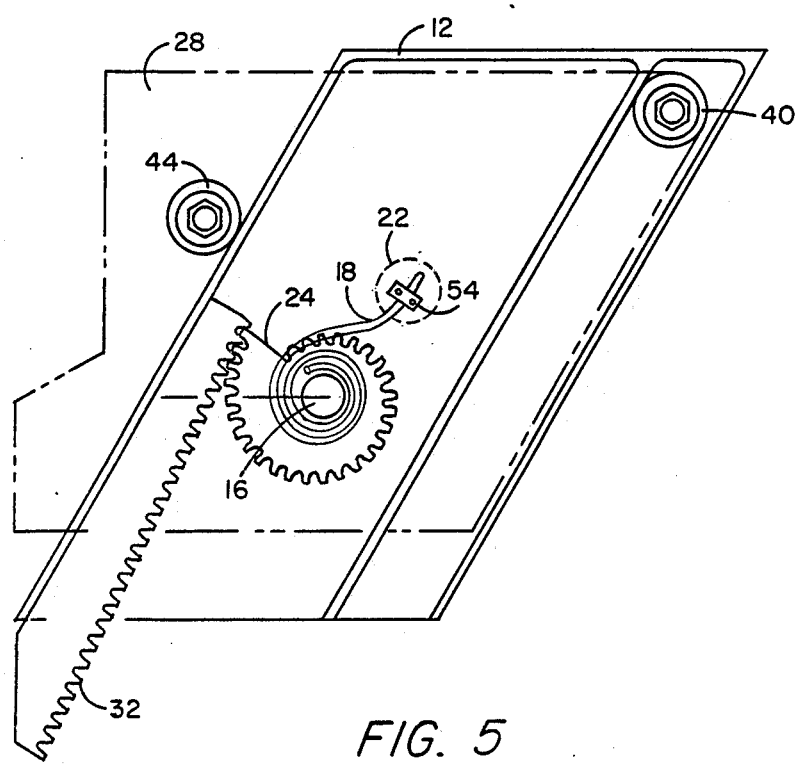
FIG. 5 is a view of the spiral and rack gears of the invention showing the torsion spring wound-up at maximum torque when the shelf is at its lowest position.

Referring now to FIGS. 1 and to FIGS. 3–5, as the shelf 13 moves vertically, the torsion spring 18 winds and unwinds as shown in FIGS. 3–5. FIG. 3 shows the shelf slide 12 fully extended to its maximum height position resulting in the torsion spring 18 being unwound or at minimum torque, the spiral gear 24 being at minimum radius and the tapered rack gear 32 being at its highest position. When the shelf slide 12 is lowered as shown in FIG. 4, the spiral gear 18 rotates with the shaft 16 supplying torque which varies linearly with the shaft angle. The variable gear radius is chosen to compensate for such torque variations resulting in a constant tangential gear force. When the shelf slide 12 reaches its lowest position as shown in FIG. 5, the torsion spring 18 is fully wound or at maximum torque, the spiral gear 24 is at maximum radius thereby compensating for the spring torque and the tapered rack gear 32 is fully extended. The spiral gears 24, 26 avoid the torsion spring 18 supplying too much force at the lowest shelf position and not enough force at the highest shelf position by having a large gear radius at the high spring torque position and a small gear radius at the low spring torque position resulting in a constant tangential gear force regardless of the shaft angle since the gear radius varies linearly with the shaft rotation angle ($\theta$) forming a spiral perimeter.

Referring to FIG. 1, the spiral gears 24, 26 positioned on each end of the shaft 16 cause two moving rack gears 32, 34 to travel equal amounts thereby maintaining a level shelf and avoiding side-to-side tilting. Any side-to-side tilting is opposed by torque in the shaft. The shaft is sized to have a 1.00 inch diameter in order to provide proper torsional stiffness. This results in a shelf having a rigid "feel" to a user. The spiral gears 24, 26 rotate approximately 330° for full travel of the mechanism or the shelf 13. By using less than one full revolution, the spiral gears 24, 26 have a unique radius for each angle. Such a gear is simpler than a multiturn configuration, but still allows a large radius change. The teeth of the spiral gears 24, 26 and rack gears 32, 34 provide a means for holding the shelf 13 against motion in either direction. The straight rack gears 32, 34, are 1 inch longer than the travel distance. For ease of construction, the preferred embodiment uses a standard tooth profile on the rack. An "off-the-shelf" 20° pressure angle, 8 diametral pitch rack is modified by tilting it at 5.344° to the direction of motion. The choice of this angle and the design of the mating spiral gear is described next.

Referring to FIGS. 3 and 4, the radius (r) of the spiral gear 24 varies linearly with travel position due to the straight rack pitch line which is angled at $\phi$. If x is the distance travelled, the shaft angle ($\theta$) is determined as follows:

$$\frac{d\theta}{dx} = \frac{1}{r} = \frac{1}{(a + x \tan \phi)} \quad (1)$$

or:

$$\theta = \cot \phi \log (x + a \cot \phi)$$

where:
 r = spiral gear pitch radius
 a = minimum spiral gear pitch radius
 $\phi$ = rack gear angle The force developed by the rack gear is determined by:

$$F = \frac{T}{r} \quad (2)$$

$$F = \frac{b + c\theta}{r}$$

-continued $$F = \frac{b + c\,(\cot\phi\,\log(x + a\cot\phi))}{a + x\tan\phi}$$

where T is the torque in the torsion spring 18, and b and c are spring constants for spring preload and spring rate, respectively. The desired condition of one spiral gear revolution over the shelf travel determines the value of "a"; from equation (1) above:

$$2\pi\text{radians} = \theta_2 - \theta_1 \quad (3)$$
$$= \cot\phi(\log(L_t + a\cot\phi) - \log(a\cot\phi)$$

where, $L_t$=length of travel.

Equation (3) gives a value for "a" for each choice of $\phi$. By substituting this value of "a" into equation (2), and assuming $F(\theta_2)=F(\theta_1)$=shelf weight, the remaining constants b and c are determined.

The only parameter to be chosen is $\phi$, the rack angle. $F(\theta)$ will vary slightly between the extremes of motion at $\theta_1=0°$ when shelf assembly 10 is at a maximum height and $\theta_2=360°$ when shelf assembly 10 is at a minimum height. This variation is allowed to be 4.3% for the preferred embodiment, and the solution of the above equations gives:

$\phi=5.3444°$
a=1.2863 inches
b=160.8 inch-pounds
c=20.47 inch-pounds/radian
for $L_t$=11 inches and F=125 pounds These parameters specify a spiral gear 24, 26 having a radius of 1.2863 inch minimum and 2.315 inch maximum. The variation of pitch radius over the full travel is required for making the spiral gear and is expressed as:

$$r(\theta) = a\,e^{(\theta\,\tan\phi)} \quad (4)$$
$$= 1.2863''\,e^{(\theta/612.47)} \text{ for } \theta \text{ in degrees}$$

The above gear calculations provide for a torsion spring 18 preloaded by 1¼ turns and wound to 2¼ turns at the lowest shelf position. For economy of space and material, the torsion spring 18 is designed with its stress at the maximum permitted when wound to the maximum of 2¼ turns. The allowable stress level for this size range of "MB" oil-tempered spring wire is approximately 138,000 psi for $10^6$ cycles without fatigue failure. The limited range of stress due to the 1¼ turn lower limit, or preload, allows roughly 10% higher stress, or 150,000 psi. Selection of the torsion spring wire from among available wire diameters is done with the following formula:

$$\sigma = \frac{10.18K}{d^3}\,T \quad (5)$$

where:
$\sigma$=bending stress (psi)
k=curvature factor
d=wire diameter (inch)
T=maximum torque (inch-pounds)
since K=1.07 due to the chosen coil diameter of approximately 3.00 inches and T (Maximum Torque) equals 125 pounds shelf times 2.315 inch gear radius which equals 289 in-lbs, then substituting values in the above equation (5) gives:

$$150,000 = \frac{(10.18)\,(1.07)\,(289)}{d^3}$$

or:

$$d \geq 0.276 \text{ inch}$$

The first standard size wire meeting this criterion is 0.2812, or 9/32 inch. The required number of coils is determined as follows:

$$\theta = \frac{TL}{EIC} = \frac{TL}{E\left(\frac{\pi d^4}{64}\right)C} \quad (6)$$

therefore, $L = (E)\left(\frac{\pi d^4}{64}\right)(C)\left[\frac{(2.25)(2\pi)}{289}\right]$ $L = 423$ inch $N = \frac{L}{\pi D} = 44.9$ or 45 coils where:
$\theta$=angle of spring, (2¼ revolutions)(2$\pi$)=14.14 radians
L=total wire length
E=modulus of elasticity=30,000,000 psi
C=curvature correction factor=0.94
D=coil diameter=3 inches
N=number of coils The torsion spring 18 provides good life and correct spring rate if made with the above calculated wire size and number of coils.

A penalty results from using a straight rack gear 32, 34 in that there is lower utilization of the spring energy. Since spring energy is proportional to the square of deflection, the residual energy of the highest position of travel is:

$$E = \frac{(2\tfrac{1}{4})^2 - (1\tfrac{1}{4})^2}{(2\tfrac{1}{4})^2} \times 100\%$$

$E = 30\%$

The residual energy may be reduced by using a larger radius ratio, but then the deviation from a logarithmic spiral increases.

This concludes the description of the preferred embodiment. However, many modifications and alterations will be obvious to one of ordinary skill in the art without departing from the spirit and scope of the inventive concept. For example, by using an exact logarithmic spiral gear and a curved rack gear, the preload and residual energy can be made smaller. Therefore, it is intended that the scope of this invention be limited only by appended claims.

What is claimed is:

1. A counterbalance mechanism comprising:
 means for guiding a movable portion of an apparatus along a vertical or inclined path;
 shaft means disposed between stationary sides of said apparatus for providing a force to counter a force of gravity on said movable portion;

means for transferring said force to said movable portion in a constant manner independent of said movable portion position, said force transferring means comprises spiral gears disposed on a first end and a second end of said shaft means; and rack gears attached to said movable portion guiding means in a vertically oriented position, each of said rack gears positioned to engage one of said spiral gears.

2. The counterbalance mechanism as recited in claim 1 wherein:

said guiding means comprises guide rails for maintaining said vertical or inclined path; and rolling bearings attached to said stationary sides for sliding along said guide rails.

3. The counterbalance mechanism as recited in claim 1 wherein:

said force providing shaft means comprises a torsion spring wrapped around a shaft, a first end of said spring attached to said shaft and a second end secured to a non-rotating portion of said apparatus; and each of said stationary sides of said apparatus comprises a hole with rotary bearings for supporting said shaft means.

4. The counterbalance mechanism as recited in claim 3 wherein:

said spiral gears provide a smaller gear radius when said torsion spring is unwound and said movable portion is raised to a maximum height.

5. The counterbalance mechanism as recited in claim 3 wherein:

said spiral gears provide a larger gear radius when said torsion spring is wound and said movable portion is lowered to a minimum height.

6. The counterbalance as recited in claim 3 wherein:

said counterbalance mechanism comprises means for adjusting the relative positions of each end of said torsion spring.

7. The counterbalance mechanism as recited in claim 6 wherein:

said spring adjusting means comprises an adjustable spring stop assembly attached to said non-rotating portion of said apparatus.

8. An adjustable shelf of an equipment console having a counterbalance mechanism comprising:

a shaft extending the width of said shelf through holes having rotary bearings in the sides of said equipment console;

a torsion spring wrapped around a portion of said shaft, one end of said spring attached to said shaft and the other end secured to a non-rotating portion of said equipment console;

a first spiral gear disposed on a first end of said shaft and a second spiral gear disposed on a second end of said shaft;

a shelf slide means for moving said shelf in a vertical or inclined path; and a first rack gear and a second rack gear attached in vertical positions to engage said first spiral gear and said second spiral gear respectively disposed on the ends of said shaft.

9. The adjustable shelf as recited in claim 8 wherein:

said first spiral gear and said second spiral gear provide a smaller gear radius for transferring a constant tangential force when said torsion spring is unwound and said shelf is adjusted to a maximum height.

10. The adjustable shelf as recited in claim 8 wherein:

said first spiral gear and said second spiral gear provide a larger gear radius for transferring a constant tangential force when said torsion spring is wound and said shelf is adjusted to a minimum height.

11. The adjustable shelf as recited in claim 8 wherein:

said shelf slide means comprises a plurality of guide rails positioned on opposite sides of said shelf slide means to enable said shelf to move in said vertical or inclined path.

12. The adjustable shelf as recited in claim 11 wherein:

said adjustable shelf comprises rolling bearings for guiding said shelf slide means in accordance with said guide rails.

13. The adjustable shelf as recited in claim 8 wherein:

said adjustable shelf comprises a latching means for securing said shelf at one of a plurality of positions along said vertical or inclined path.

14. A method of counterbalancing an adjustable shelf of an equipment console comprising the steps of:

extending a shaft affixed to said equipment console the width of said shelf, each end of said shaft being supported and surrounded by rotary bearings;

wrapping a torsion spring around a portion of said shaft, one end of said spring being secured to a non-rotating portion of said equipment console and the other end of said spring being attached to said shaft;

disposing a first spiral gear on a first end of said shaft and a second spiral gear on a second end of said shaft;

moving said shelf in a vertical or inclined direction by slide means; and engaging a first rack gear and a second rack gear to said first spiral gear and said second spiral gear respectively, said first rack gear and said second rack gear being attached to said shelf slide means at a slight angle to the direction of shelf motion.

15. The method as recited in claim 14 wherein:

said step of moving said shelf in a vertical or inclined direction comprises providing rolling bearings for guiding said shelf slide means.

16. The method as recited in claim 14 wherein:

said step of wrapping a torsion spring around a portion of said shaft comprises the step of adjusting the relative positions of each end of said torsion spring by an adjustable spring stop assembly attached to said non-rotating portion of said equipment console.

* * * * *